June 27, 1950 — A. J. COTHERN — 2,512,791
MINNOW BUCKET

Filed Aug. 22, 1944 — 3 Sheets-Sheet 1

Inventor
Alfred Jackson Cothern

By Clarence A. O'Brien
and Harvey B. Jacobson
Attorneys

June 27, 1950 A. J. COTHERN 2,512,791
MINNOW BUCKET
Filed Aug. 22, 1944 3 Sheets-Sheet 2

Inventor
Alfred Jackson Cothern.

By Clarence A. O'Brien
and Harvey B. Jacobson
Attorneys

June 27, 1950 A. J. COTHERN 2,512,791
MINNOW BUCKET

Filed Aug. 22, 1944 3 Sheets-Sheet 3

Inventor
Alfred Jackson Cothern.

By Clarence A. O'Brien
and Harvey B. Jacobson
Attorneys

Patented June 27, 1950

2,512,791

UNITED STATES PATENT OFFICE 2,512,791

MINNOW BUCKET

Alfred Jackson Cothern, Tucumcari, N. Mex.

Application August 22, 1944, Serial No. 550,589

4 Claims. (Cl. 43—56)

My invention relates to improvements in minnow buckets, the principal object in view being to provide a simply constructed bucket for transporting minnows for use as fishing bait, and which is adapted for attachment to an automobile for operation to thoroughly aerate water in the bucket as an incident to forward travel of the automobile, whereby the minnows may be kept alive and in good condition for bait, particularly during long journeys on fishing trips.

Other and subordinate objects are also comprehended by my invention, all of which, together with the precise nature of my improvements, will be readily understood when the succeeding description and claims are read with reference to the drawings accompanying and forming part of this specification.

Figure 1:
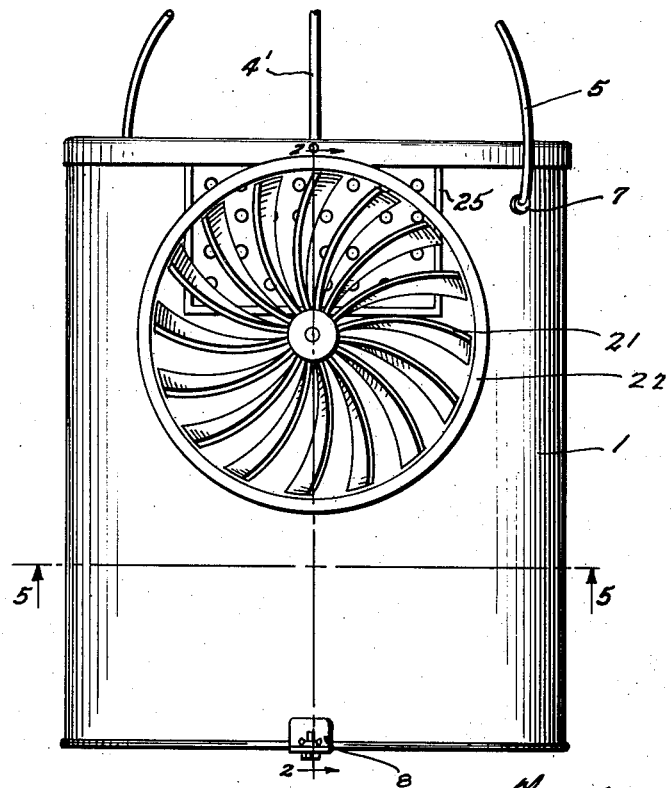
Figure 4:
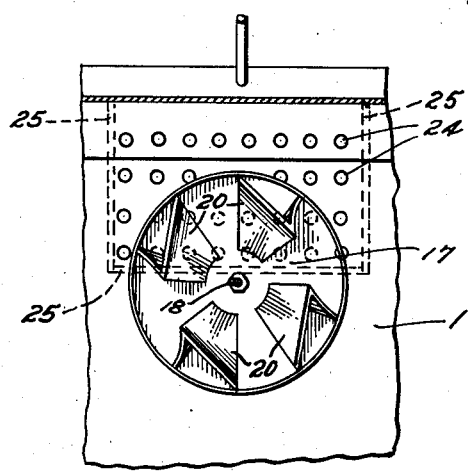
Figure 2:
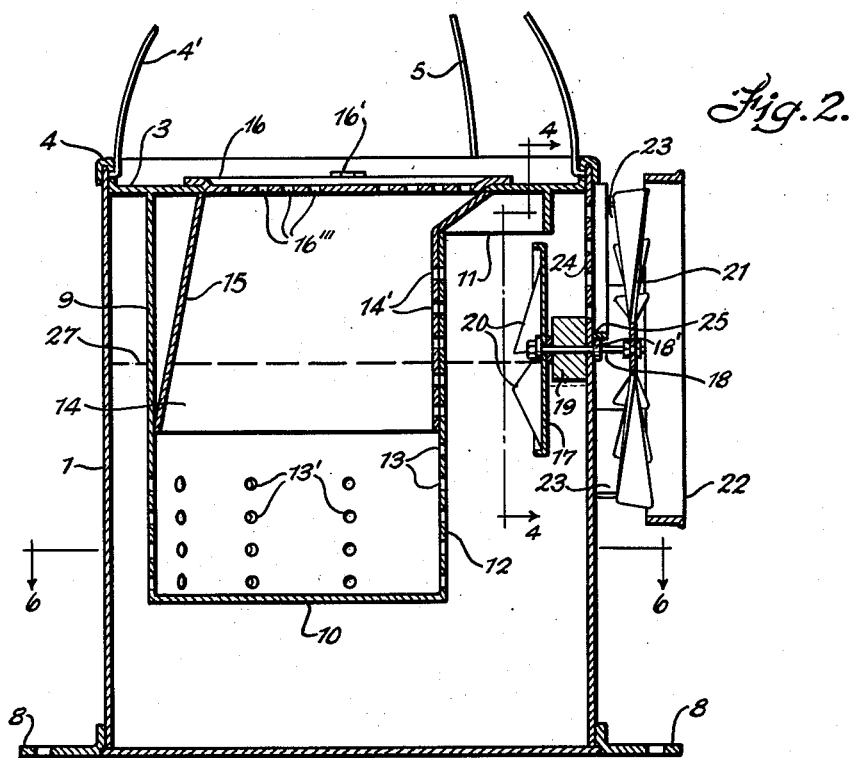
Figure 6:
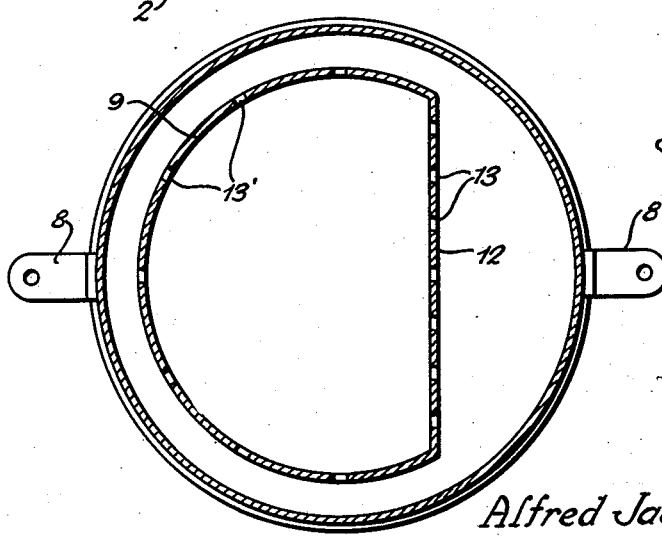
Figure 3:
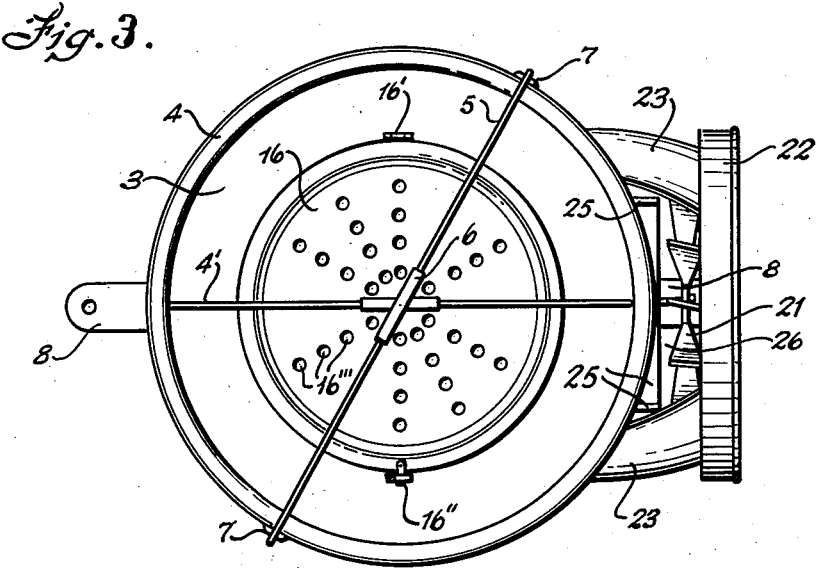
Figure 5:
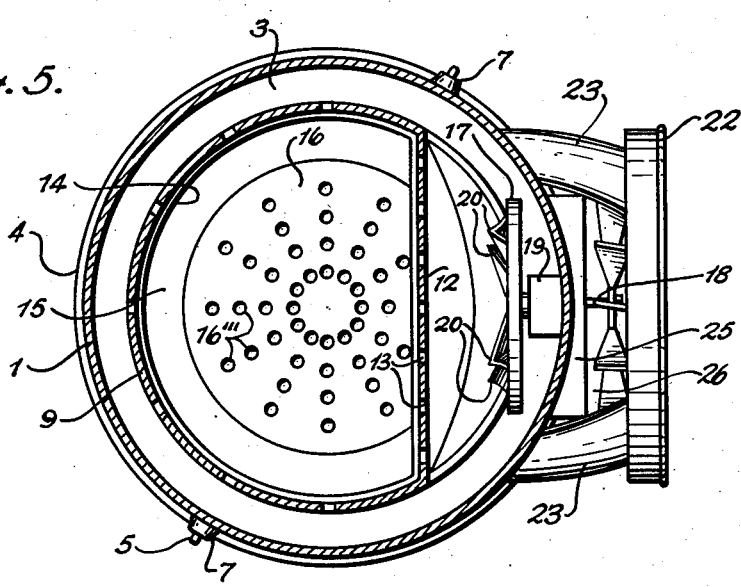

In said drawings:

Figure 1 is a view in front elevation of my improved minnow bucket, in its preferred embodiment, Figure 2 is a view in vertical section taken on the line 2—2 of Figure 1, Figure 3 is a view in top plan, Figure 4 is a fragmentary view in vertical section taken on the line 4—4 of Figure 2, Figure 5 is a view in transverse section taken on the line 5—5 of Figure 1, Figure 6 is a view in transverse section taken on the line 6—6 of Figure 2.

Referring to the drawings by numerals, my improved minnow bucket, as illustrated, comprises an outer cylindrical container 1 which may be of any suitable diameter and depth and which is provided with the usual bottom 2 and a top 3 having an upturned channeled edge bead 4 for fitting the rim of the container. A suitable carrying bail 5 with a hand grip 6 is provided for the outer container 1 and which has its ends swiveled in a pair of bosses 7 on opposite sides of said container. A pair of diametrically opposite and apertured lugs 8 extend from the container 1 adjacent the bottom 2 thereof for securing said container to an automobile, not shown, in any suitable manner to face forwardly for a purpose presently seen.

An inner, cylinder-like container 9, relatively smaller than the outer container 1, depends into the outer container from the top 3. The inner container 9 comprises a bottom 10 and is formed from a cylindrical body undercut adjacent the upper end of the body, as at 11, and flattened below the undercut to provide a flat front vertical wall 12 for the container 9 which is perforated throughout its entire area and as represented at 13. Preferably, the container 9 is integral with the top 3. A tubular member 14 suitably arranged in the upper portion of the container 9 provides a double wall around said portion and which, except at said flat wall 12, provides a downwardly and outwardly inclined baffle wall, as at 15, the purpose of which will presently appear. Below the baffle wall 15, the circumferential portion of the container 9 is perforated, as at 13'. Opposite said baffle wall 15 the tubular member 14 is provided with perforations 14' therein registering with perforations 13 in the front wall 12. A suitable bail 4' is provided on the top 3 for lifting the top 3 off the outer container, and the inner container 9 out of the outer one. A suitable lid 16 hinged, as at 16', to the top 3 is provided for closing the upper end of the tubular member 14 and which is equipped with a suitable pivoted latch 16'' and perforated as at 16'''.

A water agitating paddle wheel 17 is provided between the upper portion of the wall 12 of the inner container 9 and the opposed wall of the outer container 1 and which is fast on the inner end of a horizontal shaft 18 journaled in a bearing 19 and extended horizontally through said wall of the outer container 1. A suitable collar 18' on said shaft 18 prevents endwise movement of said shaft inwardly of the outer container 1. The shaft 18 is disposed at a suitable point midway between the top 3 of the outer container 1 and the transverse center of said container. The paddle wheel 17 is equipped with suitable bucket-like dippers, or scoops, 20 spaced apart in a circular group on the same. The dippers, or scoops 20, are formed of sheet metal, taper longitudinally, and are of substantially right-angled form in cross section with side edges suitably secured, as by welding, not shown, to one face of the paddle wheel 17 so that the smaller ends of said dippers are arranged near the center of said wheel 17, and the larger ends at the periphery of said wheel, and said face of the wheel 17, which is solid, closes said dippers 20 on the open side thereof from end to end of the same. A fan-like impeller 21 is fixed on the outer end of the shaft 18 for rotation in a cylindrical guard 22 suitably fixed to the side of the outer container 1 by spaced edge tongues 23. The guard 22 functions, as will presently clearly appear, as a wind scoop. Above the shaft 18 and between the paddle wheel 17 and the impeller 21, the intervening side wall of the outer container 1 is provided with a perforated zone 24 for admitting air into said container 1 and which is bounded at its sides and bottom by outstanding air collecting flanges 25 for deflecting air into the perforations of said zone 24. Suitable back pressure relief spaces 26 are provided in the guard 22 between the tongues 23. As will be understood, from an inspection of Figures 1 and 2, the guard 22 surrounds the lower flange 25 and the greater part of the zone 24 as well as the impeller 21.

Referring now to the use and operation of the invention, the described bucket is mounted on an automobile, in any suitable manner, with the impeller 21 facing in the direction of forward travel of the automobile, the outer and inner containers 1, 9 are filled with water to substantially the level of the axis of the paddle wheel 17, as represented by the dotted line 27 in Figure 2, and the minnows are disposed in the inner container 9. As the bucket is transported, the impeller 21 is caused to revolve by wind pressure, counter-clockwise as viewed in Figure 1, and the guard 22 functioning as a wind scoop or collector. A portion of the air after turning the impeller 21 is deflected back to atmosphere through the spaces 26. However, sufficient energy is left in the moving air after turning the impeller 21 for a small portion of the air to pass through the perforated zone 24 above the water level 27 and into the outer container 1, and then through perforations 13 and 14' into the inner container 9 above the water level 27 to be deflected by the wall 15 downwardly into the water. The air passing through the perforated zone 24 is forced therethrough due to the motion of the air with respect to the bucket 1. As the impeller 21 revolves, the paddle wheel 17 is similarly operated so that the dippers 20 scoop up water below the center of said wheel and discharge the scooped-up water above the water level to be aerated by the air forced through the perforated zone 24. At the same time, the paddle wheel 17 above its center, as the dippers 20 are emptied, pockets air in the dippers and introduces such air into the water as the dippers 20 revolve downwardly. Thus, the water in the containers 1 and 9 is adequately aerated to maintain the water fresh at all times during transporting of the bucket. To remove the inner container 9, with the minnows therein, it is merely necessary to lift the top 3 and the inner container 9 therewith, after which the lid 16 may be unlatched and swung open on the hinge 16' so that access may be had to the inner container 9.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A minnow bucket for attachment to an automobile at the front thereof to be transported thereby comprising an outer container adapted to be partly filled with water to a predetermined level, an inner relatively smaller container for minnows suspended in the outer container and having a side wall spaced from the opposed wall of the outer container, said side wall being perforated to admit water to the inner container from the outer container, said opposed wall being provided with a perforated zone above said predetermined water level to admit atmospheric air through said opposed wall into said space, a fan rotatably mounted on said opposed wall outside the same and opposite said zone for rotation by wind pressure when the automobile is traveling forwardly, and a guard on said opposed wall surrounding said fan and functioning as a wind scoop.

2. A minnow bucket for attachment to an automobile at the front thereof to be transported thereby comprising an outer container adapted to be partly filled with water to a predetermined level, an inner relatively smaller container for minnows suspended in the outer container and having a side wall spaced from the opposed wall of the outer container, said side wall being perforated to admit water to the inner container from the outer container, said opposed wall being provided with a perforated zone above said predetermined water level to admit atmospheric air through said opposed wall into said space, a fan rotatably mounted on said opposed wall outside the same and opposite said zone for rotation by wind pressure when the automobile is traveling forwardly, a guard on said opposed wall surrounding said fan and functioning as a wind scoop, and a water wheel in said space operative by said fan to splash water upwardly into the path of air passing through said zone.

3. A minnow bucket for attachment to an automobile at the front thereof to be transported thereby comprising an outer container adapted to be partly filled with water to a predetermined level, an inner relatively smaller container for minnows suspended in the outer container and having a side wall spaced from the opposed wall of the outer container, said side wall being perforated to admit water to the inner container from the outer container, said opposed wall being provided with a perforated zone above said predetermined water level to admit atmospheric air through said opposed wall into said space, a fan rotatably mounted on said opposed wall outside the same for rotation by wind pressure when the automobile is traveling forwardly, a guard on said opposed wall surrounding said fan and functioning as a wind scoop, and a water wheel in said space operative by said fan to splash water upwardly into the path of the air passing through said zone, said wheel comprising scoops for dipping up water.

4. A minnow bucket for attachment to an automobile at the front thereof to be transported thereby comprising an outer container adapted to be partly filled with water to a predetermined level, an inner relatively smaller container for minnows suspended in the outer container and having a side wall spaced from the opposed wall of the outer container, said side wall being perforated to admit water to the inner container from the outer container, said opposed wall being provided with a perforated zone above said predetermined water level to admit atmospheric air through said opposed wall into said space, a fan rotatably mounted on said opposed wall outside the same for rotation by wind pressure when the automobile is traveling forwardly, and a guard on said opposed wall surrounding said fan and functioning as a wind scoop, said outer container including a top from which the inner container is suspended.

ALFRED JACKSON COTHERN.

REFERENCES CITED

The following references are of record in the file of this patent:

UNITED STATES PATENTS

| Number | Name | Date |
| --- | --- | --- |
| 12,306 | Babbitt | Jan. 30, 1855 |
| 224,248 | Thomas | Feb. 3, 1880 |
| 1,709,424 | Zohe | Apr. 16, 1929 |
| 2,020,536 | Cox | Nov. 12, 1935 |
| 2,268,071 | Grange | Dec. 30, 1941 |
| 2,330,870 | Collier | Oct. 5, 1943 |

FOREIGN PATENTS

| Number | Country | Date |
| --- | --- | --- |
| 5,541 | Great Britain | of 1897 |
| 55,709 | Switzerland | May 20, 1911 |